US008286994B2

(12) United States Patent
Rick

(10) Patent No.: US 8,286,994 B2
(45) Date of Patent: Oct. 16, 2012

(54) HEAD AIRBAG MODULE

(75) Inventor: Ulrich Rick, Roxheim (DE)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 12/637,342

(22) Filed: Dec. 14, 2009

(65) Prior Publication Data
US 2010/0156072 A1 Jun. 24, 2010

(30) Foreign Application Priority Data

Dec. 15, 2008 (DE) .................. 10 2008 062 266

(51) Int. Cl.
*B60R 21/26* (2011.01)
*B60R 21/262* (2011.01)
*B60R 21/213* (2011.01)
(52) U.S. Cl. ..................... 280/730.2; 280/729
(58) Field of Classification Search ............... 280/730.2, 280/729
See application file for complete search history.

(56) References Cited

U.S. PATENT DOCUMENTS

| 3,868,126 | A | * | 2/1975 | Radke et al. | .................. | 280/735 |
| 6,042,141 | A | * | 3/2000 | Welch et al. | .................. | 280/729 |
| 6,095,551 | A | | 8/2000 | O'Docherty | | |
| 6,123,355 | A | * | 9/2000 | Sutherland | .................. | 280/728.2 |
| 6,276,712 | B1 | | 8/2001 | Welch et al. | | |
| 6,517,110 | B1 | * | 2/2003 | Butters et al. | .................. | 280/749 |
| 6,648,368 | B2 | | 11/2003 | Smith et al. | | |
| 6,948,735 | B2 | | 9/2005 | Hwang et al. | | |
| 7,125,038 | B2 | | 10/2006 | Gammill | | |
| 7,278,656 | B1 | | 10/2007 | Kalandek | | |
| 7,837,223 | B2 | * | 11/2010 | Shilliday et al. | .................. | 280/730.2 |
| 2003/0111829 | A1 | | 6/2003 | Tesch | | |
| 2003/0184060 | A1 | | 10/2003 | Smith et al. | | |
| 2006/0208466 | A1 | | 9/2006 | Kirby | | |
| 2008/0211210 | A1 | * | 9/2008 | Shilliday et al. | .................. | 280/730.2 |
| 2010/0148477 | A1 | * | 6/2010 | Rick | .................. | 280/730.2 |

FOREIGN PATENT DOCUMENTS

| DE | 19848794 A1 | 5/1999 |
| DE | 19757374 A1 | 6/1999 |
| DE | 20016384 U1 | 2/2001 |
| EP | 0847904 A1 | 6/1998 |
| EP | 924122 A1 * | 6/1999 |
| EP | 1816038 A1 | 8/2007 |
| GB | 2353010 A | 2/2001 |
| GB | 2393154 A | 3/2004 |
| JP | 2000335351 A | 12/2000 |

OTHER PUBLICATIONS

UK IPO, British Search Report for Application No. 0921033.7, dated Mar. 19, 2010.
German Patent Office, German Search Report for Application No. 102008062266.4, dated Oct. 12, 2010.

* cited by examiner

*Primary Examiner* — Drew Brown
(74) *Attorney, Agent, or Firm* — Ingrassia Fisher & Lorenz, P.C.

(57) ABSTRACT

A head airbag module for a motor vehicle, in particular a passenger automobile, is provided with a head airbag and a receptacle, which receives the folded head airbag. The head airbag having a gas channel and an airbag, and the head airbag module being implemented so that the head airbag is essentially completely freed from the receptacle by filling of the gas channel, before the airbag is filled.

17 Claims, 2 Drawing Sheets

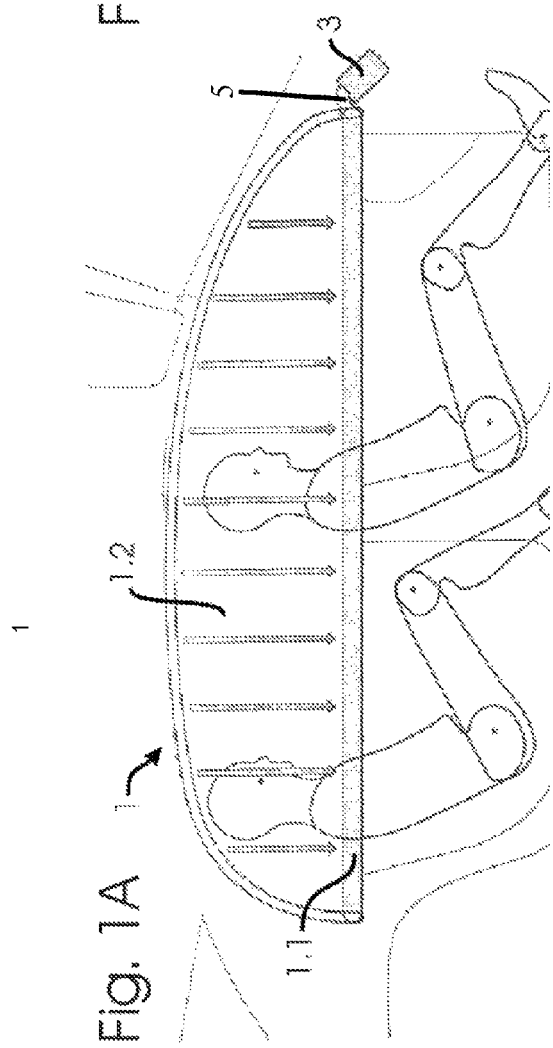
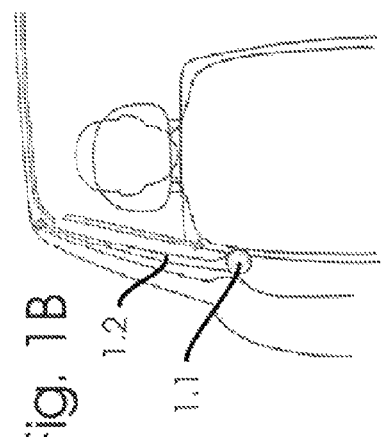
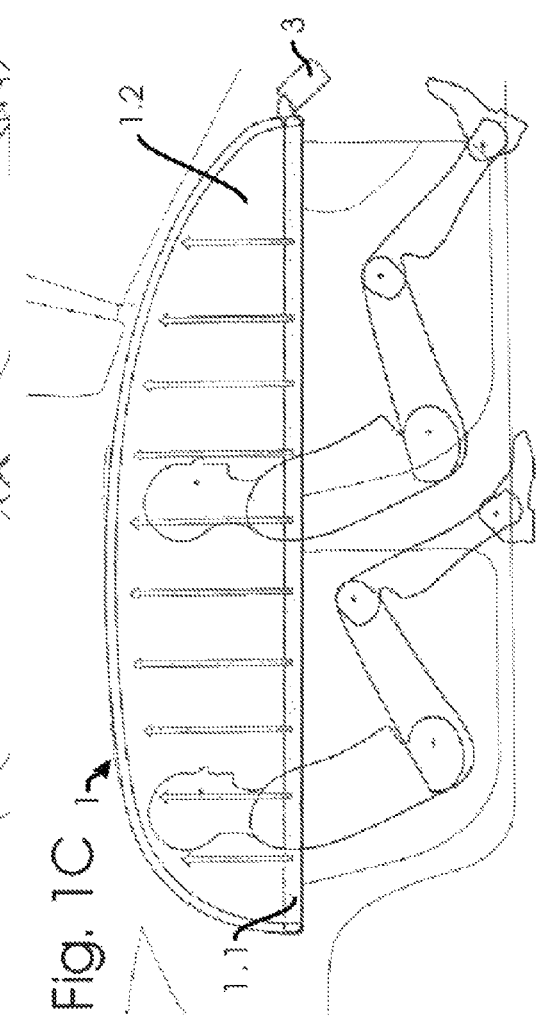
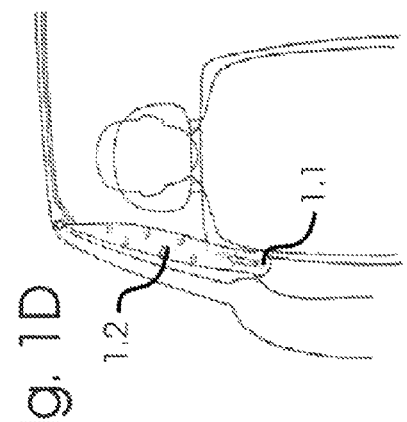

HEAD AIRBAG MODULE

CROSS-REFERENCE TO RELATED APPLICATION

This application claims priority to German Patent Application No. 102008062266.4, filed Dec. 15, 2008, which is incorporated herein by reference in its entirety.

TECHNICAL FIELD

The present invention relates to a head airbag module for a motor vehicle, in particular a passenger automobile, a head airbag system, and a motor vehicle having such a head airbag module, as well as a method for filling a head airbag of such a head airbag module.

BACKGROUND

A so-called head airbag, also referred to as a curtain airbag or window airbag, unfolds essentially on a vehicle interior in the event of an accident, in order to protect the head and thorax areas of occupants in particular in the event of a side impact or a rollover of the vehicle and to prevent the head of an occupant from projecting outside unprotected through an open side window during the accident.

For example, situating the folded head airbag in a receptacle on the roof of the vehicle for this purpose is known from U.S. Pat. No. 6,276,712 B1 and GB 2 393 154 A. The head airbag is unfolded and thus freed from the receptacle by the filling with a filling gas generated by a gas generator. A gas channel for tensioning the airbag is filled simultaneously with an airbag in U.S. Pat. No. 6,648,368 B2.

A head airbag module having a head airbag and a receptacle, which receives the folded head airbag, is known from US 2006/0208466 A1, gas channels and airbags and/or cells defined by tucks in the head airbag. This head airbag module is implemented so that firstly a horizontal gas channel on the lower edge of the head airbag is filled and a middle part of the head airbag is thus freed from the receptacle. The front and rear airbags are then also freed from the receptacle by filling.

In all known systems, the airbag is thus filled and only completely freed from the receptacle in this way. If the gas supply to the head airbag is interrupted, for example, by the penetration of an obstruction into the vehicle, which damages the gas generator or impairs its communication with the head airbag, this can prevent or delay the complete unfolding of the head airbag.

At least one object of the present invention is to improve a head airbag system according to the species. In addition, other objects, desirable features, and characteristics will become apparent from the subsequent summary and detailed description, and the appended claims, taken in conjunction with the accompanying drawings and this background.

SUMMARY

A head airbag module according to an embodiment of the invention comprises an inflatable head airbag and a receptacle, in which the uninflated, folded head airbag is received. The receptacle can have a separate housing, an envelope, and/or compression means, in particular openable belts, and/or be provided in the motor vehicle, in particular fastened removably or nonremovably thereon or integrated therein, for example, in the form of a recess or a free space behind an interior panel of the vehicle or the like.

The head airbag has one or more gas channels and one or more airbags. These may be implemented integrally with one another by suitable, in particular material bonding of two external parts of the head airbag along predefinable sewing and/or gluing lines, i.e., by so-called tucks or hinges, or may also be produced from separate materials and then preferably bonded to one another, for example, by material bonding. While the integral implementation can reduce the material outlay and the packing dimensions, the separate implementation allows the use of different materials and can make it easier to produce the individual parts, in particular in the event of more complex shaping.

According to an embodiment of the invention, the head airbag module is implemented so that the head airbag is first already freed essentially completely from the receptacle by filling at least one gas channel, before one or more airbags are then filled. The head airbag is thus also reliably freed from the receptacle in the event of subsequent impairment of the gas supply during the filling of the airbag and can thus still unfold a certain (residual) protective effect even if the airbag is not filled or is only partially filled.

In an advantageous embodiment, the head airbag module can be implemented so that the head airbag is located in the area of areas particularly to be protected, such as a head and/or thorax area of a vehicle occupant, after being freed from the receptacle, and the airbag is completely filled from this state. In this way, firstly the areas particularly to be protected are covered by the filling airbag and the already filled gas channel. In addition, the time which is required in order to displace the head airbag from the receptacle into the provided unfolding area can be shortened by the low inertia and the reduced air resistance of the not yet filled airbag.

The multistep filling of gas channel and airbag can be implemented in various ways. For example, it can be controlled by corresponding guiding of the filling gas, in that the airbag is filled by the gas channel, for example, and the gas channel is implemented so that the filling of the airbag only occurs upon complete filling of the gas channel and/or when freeing from the receptacle has occurred. This can be implemented, for example, by corresponding throttle points or valves, which only open toward the airbag when the gas channel is filled and/or the head airbag is freed. Such throttle points or valves may be implemented between the gas channel and the airbag, for example, by corresponding shaping of the head airbag. Additionally or alternatively, it is also possible to implement the gas supply to the airbag separately, for example, through a valve before the head airbag or the supply by a second gas generator, and to control it correspondingly, for example, with a time delay.

The head airbag module is preferably implemented so that the airbag is also essentially only filled from bottom to top, directional specifications always relating in the present case to the filled state installed in the vehicle. The receptacle is advantageously situated on a lateral area of the vehicle roof, in order to expose door openings when the head airbag is not activated. While a typical head airbag fills essentially from top to bottom, starting from the roof-side receptacle, in the preferred embodiment, the airbag which is not yet filled can be brought essentially to head or waistline height of the A, B, or C column by the gas channel, for example, i.e., essentially to half the height of the side window opening or essentially to the height of the lower edge of the side window opening, in order to fill upward starting from the waistline height or upward and downward starting from the head height. Thus, while firstly a roof area is protected, in which the occupant is not even located, and his thorax remains unprotected until the airbag has unfolded downward with typical filling from the top, in the preferred embodiment, firstly the thorax and/or head areas of the passenger are protected, in that the airbag fills upward or upward and downward starting from this area.

The gas channel preferably extends essentially through the entire head airbag, for example, essentially along a lower edge of the head airbag or essentially at half the height of the head airbag. This is advantageous in particular for the previously explained embodiment if the gas channel of the airbag, which is placed by the gas channel at the height of the head or waistline, is filled.

One or more gas inlet connections in the gas channel are preferably situated essentially at the height of the gas channel. In this way, the gas pathway and thus the filling time can be reduced. In particular, for this purpose the gas generator can advantageously also be situated essentially at the height of the gas channel, for example, in an A column, B column, or C column of the motor vehicle.

BRIEF DESCRIPTION OF THE DRAWINGS

The present invention will hereinafter be described in conjunction with the following drawing figures, wherein like numerals denote like elements, and:

FIG. 1A shows a motor vehicle having a head airbag system according to a first embodiment of the present invention in a sectional side view in a first filling step;

FIG. 1B shows a part of the motor vehicle from FIG. 1A in a sectional frontal view;

FIG. 1C shows the motor vehicle from FIG. 1A in a second filling step;

FIG. 1D shows the part of the motor vehicle from FIG. 1B in the second filling step.

DETAILED DESCRIPTION

Figure 2B:
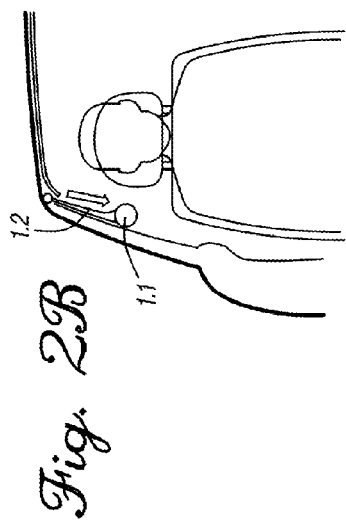
FIGS. 2A-2D show a motor vehicle having a head airbag according to a second embodiment of the present invention in an illustration corresponding to FIGS. 1A-1D.
Figure 2D:
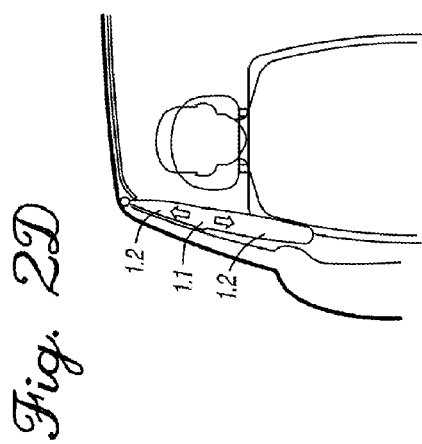

The following detailed description is merely exemplary in nature and is not intended to limit application and uses. Furthermore, there is no intention to be bound by any theory presented in the preceding background or summary or the following detailed description.

A motor vehicle having a head airbag system according to the present invention is shown in FIG. 1 in a first filling state (FIGS. 1A, 1B) and a second filling state (FIGS. 1C, 1D), each in a side view (FIGS. 1A, 1C) and a frontal view (FIGS. 1B, 1D).

A receptacle 2 for a head airbag 1 is implemented in a roof area of the vehicle behind an interior panel (not shown). In particular an upper area of a vehicle body side, a lateral edge spar of the vehicle roof, or the like is referred to as the roof area.

In the inactivated state, the head airbag 1 is received folded in the receptacle 2 and concealed by the interior panel. In case of a side impact or a rollover, a controller (not shown) activates a gas generator 3. This gas generator generates a filling gas, which flows through a gas inlet connection into a gas channel 1.1 of the head airbag 1, which is received still folded in the receptacle 2 at this point in time. The gas channel 1.1 is implemented integrally with an airbag 1.2, which extends above the gas channel 1.1 when the head airbag 1 is completely filled (FIGS. 1C, 1D), by corresponding hinges, which may be implemented, for example, by a glued or welded seam between an inner and outer half of the head airbag 1, on a lower longitudinal edge of the head airbag 1.

Through the filling gas channel 1.1, which shortens in the vehicle longitudinal direction at the same time, the head airbag 1, which opens the interior panel at the same time, is completely freed from the receptacle 2 and drawn into the position shown in FIG. 1, in which the gas channel 1.1 extends essentially along the waistline, i.e., the side window lower edge of the vehicle. This movement is indicated by vertical arrows downward in FIGS. 1A, 1B. As shown, a valve 5 is in fluid communication with gas generator 3 and is positioned upstream of the gas channel 1.1 and airbag 1.2. As a result, the gas supply may be implemented to the airbag 1.2 separately from the gas supply implemented to the gas channel 1.1. In other words, the valve 5 provides for controlling filling the airbag 1.2 independent of filling the gas channel 1.1. Further, the gas supply through the valve 5 may be controlled, for example, with a time delay.

The airbag 1.2 communicates via throttle openings (not shown) with the gas channel 1.1. While the first filling step, in which the gas channel 1.1 is filled with gas, frees the head airbag 1 from the receptacle 2 and brings it into the position shown in FIG. 1, the airbag 1.2 is essentially unfilled, because at most little filling gas flows into it through the throttle points. The lower inertia and the lower air resistance of the unfilled airbag 1.2 shorten the inflation time for the first filling step, i.e., the time until reaching the state shown in FIGS. 1A, 1B, in which the already unfolded head airbag 1 already protects the occupants to a certain degree, in particular against exiting from the side windows.

If the gas channel 1.1 is completely filled and the state shown in FIGS. 1A, 1B has been reached, the throttle points open, so that in a second filling step, the airbag 1.2 is now also filled via the gas channel 1.1 through the throttle points by the gas generator 3 and the head airbag 1 unfolds its complete protective effect. This filling from bottom to top is indicated by vertical arrows upward in FIGS. 1C, 1D.

In order to keep the gas pathways short, the gas generator 3 is situated approximately at the height of the gas channel 1.1 (when head airbag 1 is filled) in an A column of the motor vehicle.

FIGS. 2A through 2D show, in an illustration corresponding to FIGS. 1A through 1D, a motor vehicle having a head airbag system according to a second embodiment of the present invention. Features corresponding to the first embodiment are identified using identical reference numerals, so that only the differences between the two embodiments are discussed hereafter.

In the second embodiment, the gas channel 1.1 is situated approximately at half the height of the head airbag 1, i.e., approximately at half the height of the side window opening, when the airbag 1 is filled. The gas generator 3 is situated in the middle area of the C column of the motor vehicle and communicates via a filling tube with the gas inlet connection of the gas channel 1.1, which is situated at the height of the gas channel 1.1, in order to shorten the gas pathways.

Figure 2A:
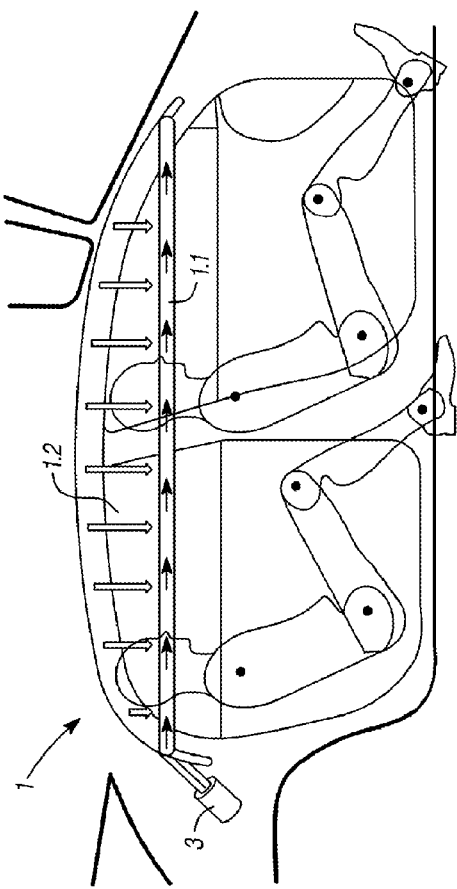
Figure 2C:
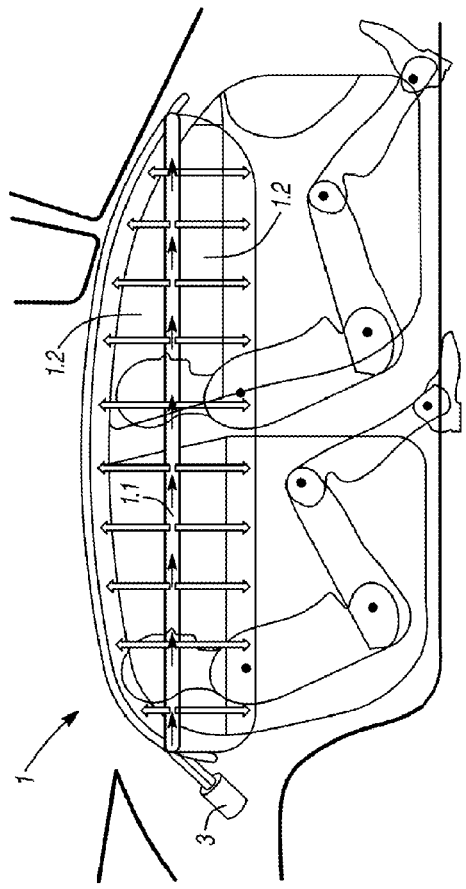

In a first step, the gas channel 1.1 is again first filled by decanting gas from the gas generator 3 into the gas inlet connection and in this way the head airbag 1 is brought into the position shown in FIGS. 2A, 2B with the airbag 1.2 still unfilled, in which the already filled gas channel 1.1 extends essentially at the head height of the occupants and already protects them, even if the gas supply is subsequently impaired hereafter. In a second filling step, the airbag 1.2 is subsequently filled from below through throttle points from the gas channel 1.1, a further part of the airbag 1.2 being filled from above from the gas channel 1.1 and being inflated downward. In comparison to the first embodiment, the inflation time can thus be shortened, because the pathway distances within the airbag parts are approximately equal.

While at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

What is claimed is:

1. A head airbag system for a motor vehicle, comprising:
a head airbag comprising a gas channel and an airbag; and
a receptacle that is adapted to receive the head airbag in a folded position,
wherein the head airbag system is configured so that the head airbag is essentially completely freed from the receptacle by filling of the gas channel before filling the airbag; and
wherein the head airbag system is configured so that the airbag is filled after a time delay after complete filling of the gas channel.

2. The head airbag system according to claim 1, wherein a gas inlet connection is situated in the gas channel essentially at a height of the gas channel.

3. The head airbag system according to claim 1, further comprising a gas generator situated essentially at a height of the gas channel.

4. The head airbag system according to claim 1, wherein the head airbag system is configured so that gas is implemented to the airbag separately from gas implemented to the gas channel.

5. A motor vehicle, comprising:
a roof having a side area; and
a head airbag system, the head airbag system comprising:
a head airbag comprising a gas channel and an airbag; and
a receptacle that is adapted to receive the head airbag in a folded position and situated on the side area of the roof,
wherein the head airbag system is configured so that the head airbag is essentially completely freed from the receptacle by filling of the gas channel before filling the airbag;
wherein the head airbag system is configured so that the head airbag is filled after complete filling of the gas channel; and wherein the head airbag system is configured so that gas is implemented to the airbag separately from gas implemented to the gas channel.

6. The motor vehicle according to claim 5, wherein the gas generator is situated in an A column of the motor vehicle.

7. The motor vehicle according to claim 5, wherein the gas generator is situated in a B column of the motor vehicle.

8. The motor vehicle according to claim 5, wherein the gas generator is situated in a C column of the motor vehicle.

9. The motor vehicle according to claim 5, further comprising a gas generator situated essentially at a height of the gas channel.

10. The motor vehicle according to claim 5, wherein the airbag is configured to be filled independent of filling of the gas channel.

11. The motor vehicle according to claim 5, wherein the head airbag system is configured so that the airbag is filled after a time delay after complete filling of the gas channel.

12. A method for filling a head airbag of a head airbag system wherein the head airbag comprises a gas channel and an airbag, and wherein a receptacle is adapted to receive the head airbag in a folded position, the method for filling the head airbag of the head airbag system comprising the steps of:
completely filling the gas channel; and
filling the airbag after a time delay after complete filling of the gas channel,
wherein the head airbag is essentially completely freed from the receptacle by the filling of the gas channel before the filling of the airbag.

13. The method according to claim 12, wherein the filling the gas channel comprises filling the gas channel with a gas generator situated essentially at a height of the gas channel.

14. The method according to claim 12, further comprising controlling filling the airbag independent of filling the gas channel.

15. The method according to claim 12, wherein filling the airbag is accomplished independent of filling the gas channel.

16. The head airbag system according to claim 1, wherein the airbag is configured to be filled independent of filling of the gas channel.

17. The method according to claim 12, wherein the filling the gas channel and filling the airbag comprises implementing gas to the airbag separately from gas implemented to the gas channel.

* * * * *